April 19, 1938.  W. E. ROSEBUSH  2,114,814
STUFFING AND SEALING MACHINE
Filed May 13, 1936  6 Sheets-Sheet 4

WITNESSES
Edw. Thorpe
Chris Feinle

INVENTOR
Waldo E. Rosebush
BY
Munn Anderson Liddy
ATTORNEYS

Patented Apr. 19, 1938

2,114,814

UNITED STATES PATENT OFFICE 2,114,814

STUFFING AND SEALING MACHINE

Waldo E. Rosebush, Millwood, Wash.

Application May 13, 1936, Serial No. 79,494

29 Claims. (Cl. 93—6)

This invention relates to a machine for stuffing or inserting desired matter into envelopes and then sealing and discharging them successively.

The machine is useful in the mailing department of large business, mercantile, commercial, and other analogous concerns which send out large quantities of mail.

The machine may be used advantageously with a folding machine to receive the output of folded matter, such as sheets containing letters, communications, etc., and in timed accord with the delivery of said matter, stuff or insert the same severally and successively into suitable envelopes.

The principal object of the invention is the provision of a machine of the indicated character whereby the work of enclosing mail matter in envelopes and then sealing them may be accomplished expeditiously.

With the foregoing and other objects in view, the invention resides in the combinations, arrangements and operations of the parts as hereinafter described and claimed, and as illustrated in the accompanying drawings, in which

Generally stated, the machine of the present invention comprises means for feeding empty and unsealed envelopes one at a time to a predetermined position in relation to the top of a table; means for moving the flap of each envelope to open and closed position; means for stuffing or inserting desired matter into each envelope when its flap is thrown back to open position; means for conditioning or moistening the adhesive on the inside of the flap of each envelope so that it may be secured to the body of the envelope to seal the latter; and means to effectually seal each envelope after its flap has been made ready as aforesaid, and then deliver it into a suitable receptacle.

The machine will be capable of enclosing suitable matter, such as ordinary correspondence, invoices, and other usual office output in window envelopes; and mimeographed letters and other similar mail matter which require addressed envelopes may be enclosed in such latter envelopes.

Referring now more particularly to the drawings, it will be apparent that there is shown a magazine 10 for containing a multiplicity of empty and unsealed envelopes 11 in stack formation. The magazine 10 is open at the top and its side walls 12 and 13 respectively and end walls 14 and 15 respectively are provided from a single piece of sheet metal bent into rectangular formation. The lower edge portions of said walls are secured, as at 16, to a rectangular bottom or base 17 of wood or other suitable material. The side walls 12 and 13 project above the end walls and each side wall has its upper edge portion rolled throughout its length to provide abutment means 18, to be engaged by each envelope when it is uppermost. The side wall 12 at one corner is separated from the adjacent end wall 15, and is sprung inwardly so as to exert a certain amount of resistance to prevent endwise movement of the envelopes except the top or uppermost one of the stack. The stack of envelopes rests on a follower 19 within the magazine and a zigzag spring 20 or equivalent means is arranged within the magazine between the base 17 and the follower 19 to move said stack upwardly and thus present one envelope 11 at a time to the abutment means 18 which engages the opposite long side edges of each envelope. In the present instance, by way of example, the magazine 10 is designed to accommodate large size envelopes of the standard size of 4⅛ inches by 9½ inches. The magazine 10 is positioned at one end of a table 21 consisting of a horizontal frame 22 having depending legs 23, and a horizontal top plate 24 secured to the opposite sides of the frame 22. The plate 24 has formed thereon or secured thereto a deflector 25 which extends transversely.

In the present instance, by way of example, this invention is shown in use in conjunction with a sheet folding machine of a type as disclosed in my pending application Serial No. 64,862, filed February 20, 1936. The sheet folding machine includes a unit which folds sheets successively fed thereto. These sheets for the large size envelopes mentioned hereinabove, are 8½ inches wide by 11 inches long. Each sheet is given two folds spaced approximately equi-distantly transversely of the longitudinal axis of the sheet, so as to fit in the envelope 4⅛ inches by 9½ inches. The folding machine includes standards 30, a main roller 31, and auxiliary rollers 32 and 33 respectively which cooperate with the roller 31 to advance the sheets in the folding thereof. The roller 31 is mounted on a drive shaft 34 supported for rotation by bearing on the standards 30, and each of the rollers 32 and 33 has arbors 35 on the opposite ends which are received respectively in notches in the standard 30. The shaft 34 has a hand crank 36 for rotating the shaft 34 and roller 31. The folding machine includes other features besides those mentioned, but they have been omitted because they are not necessary for a full understanding of the present machine. The folded sheets are discharged from the folding machine by passing between the rollers 31 and 33 which act on the sheets.

Figure 6:
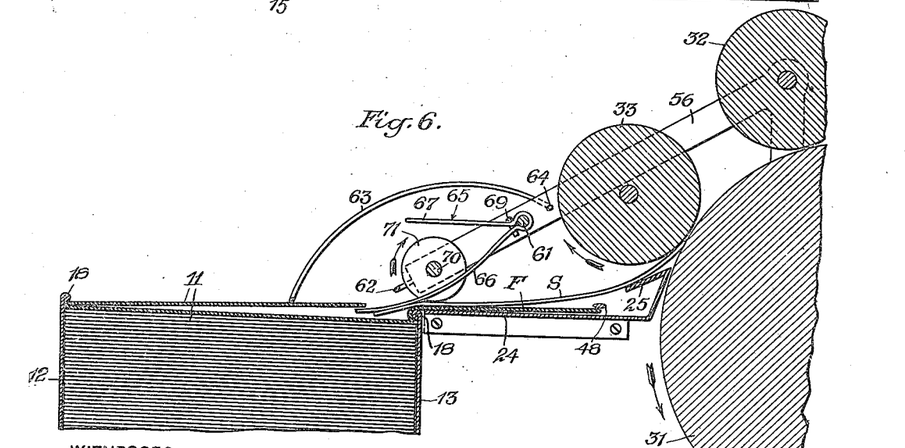
Fig. 6 is an enlarged fragmentary section taken on the line 6—6 of Fig. 1, and illustrating the manner in which a folded sheet is stuffed or inserted into an envelope.

The table 21 is arranged at the discharge end of the folding machine, and its frame 22 is secured to the standards 30 at one side as at 37, and its other bent out side as at 38. The deflector 25 parallels the axes of rotation of the rollers 31 and 33 and is disposed in proximity to the pinch of said rollers so as to deflect each folded sheet S over the top plate 24 as it passes from between the rollers, as shown in Fig. 6. The top plate 24 is on the level with the abutment means 18 of the magazine also shown in Fig. 6. The flaps of the envelopes 11 are at the top plate side of the magazine. The flap of an envelope is designated F.

Figure 1:
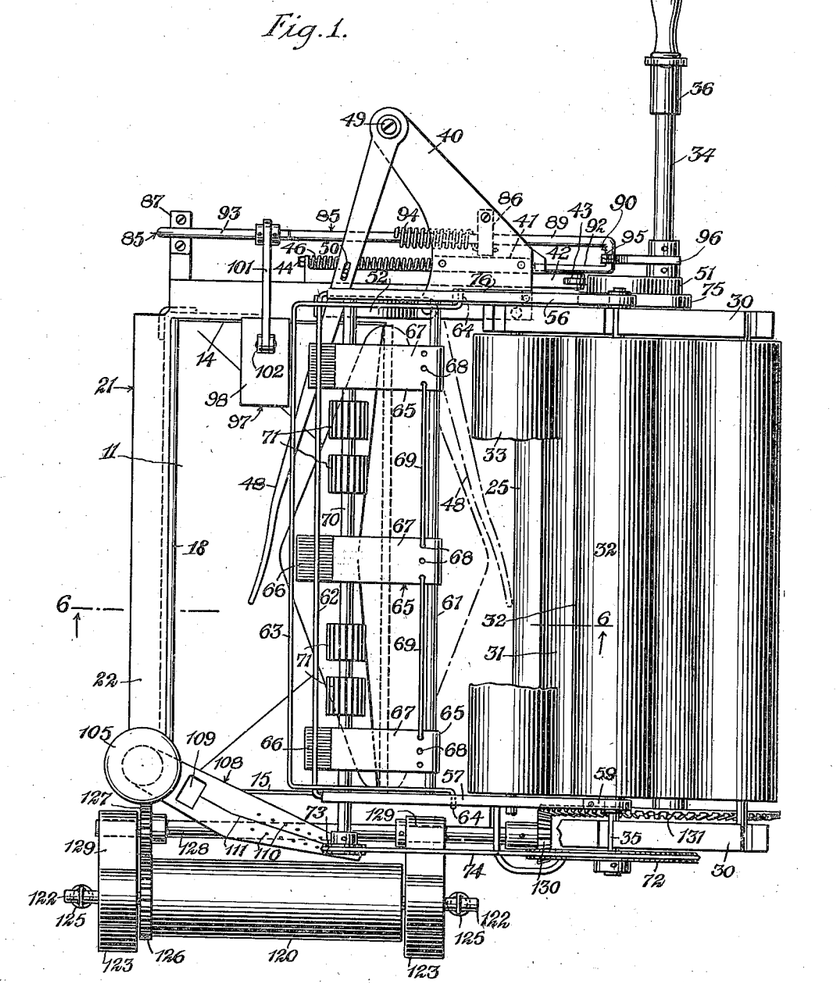
Figure 1 is a plan view of a machine embodying the features of the invention, shown in use in conjunction with a sheet folding machine by way of example.

In order to throw back the flap of each envelope and later return it to its original position, or, in other words, in order to move the flap of each envelope to open and closed positions, use is made of the means as follows. A bracket 40 is secured to the frame 22 at the crank side. The bracket 40 has formed integral therewith or secured thereto as shown on its under side, a guide 41. The guide 41 receives a rod 42 for reciprocal movement. One end of the rod 42 has a roller 43 and its opposite laterally bent end carries an adjusting screw 44. The guide has a lug 45 struck from its outside wall. A retractile coil spring 46 has one end thereof connected with the screw 44 and its other end is connected with the lug 45. A brass spacer and wear piece 47 is arranged between the bottom wall of the guide 41 and the rod 42. A flexible flap throw member 48 has one end thereof loosely connected with the outer end of the bracket 40 by a screw pivot 49 so that said member 48 may have compound movement, or, in other words, pivotal movement in a horizontal plane and also up-and-down movement with respect to said plane. The member 48 is connected with the rod 42 by a pin-and-slot connection 50, so that the member will move in response to the reciprocating movement imparted to the rod 42. The member 48 is tapered almost to a point and is bowed or curved at its free end so as to readily engage under the envelope flap. The member 48 is long enough to reach over the magazine 10 a short distance beyond a middle point on the envelope. The roller 43 carried by the rod 42 is acted on by a cam 51 secured to the shaft 34 to rotate with the latter, so that the member 48 will swing or pivot back and forth once in each revolution of the shaft 34. A cam or guide 52 is secured to the table frame 22 adjacent the bracket 40, to cause the member 48 to move upwardly and then allow it to move downwardly while moving away from the magazine, and likewise cause the member 48 to move upwardly and then allow it to move downwardly while moving toward the magazine. The spring 46, through the intervention of the rod 42 and the pin-and-slot connection 50, causes the member 48 to move from the position in full lines to its position in dotted lines shown in Fig. 1. During that movement the member 48 is rocked up and down by reason of the guide 52, causing the flap of the uppermost envelope to be swung or thrown back to open position indicated in dotted lines in Fig. 1. The cam 51 acting on the roller 43 causes forward movement of the member 48 and during that movement the member 48 is also rocked up and down by reason of the guide 52, causing the flap to be moved from its open position to its original or closed position. The cam 51 is designed to allow the member 48 to clear the flap F in open position, and said cam also causes a dwell in the forward movement when closing the flap so that the envelope may be transferred to the moistener.

Figures 2, 12, 13, 14, 15:
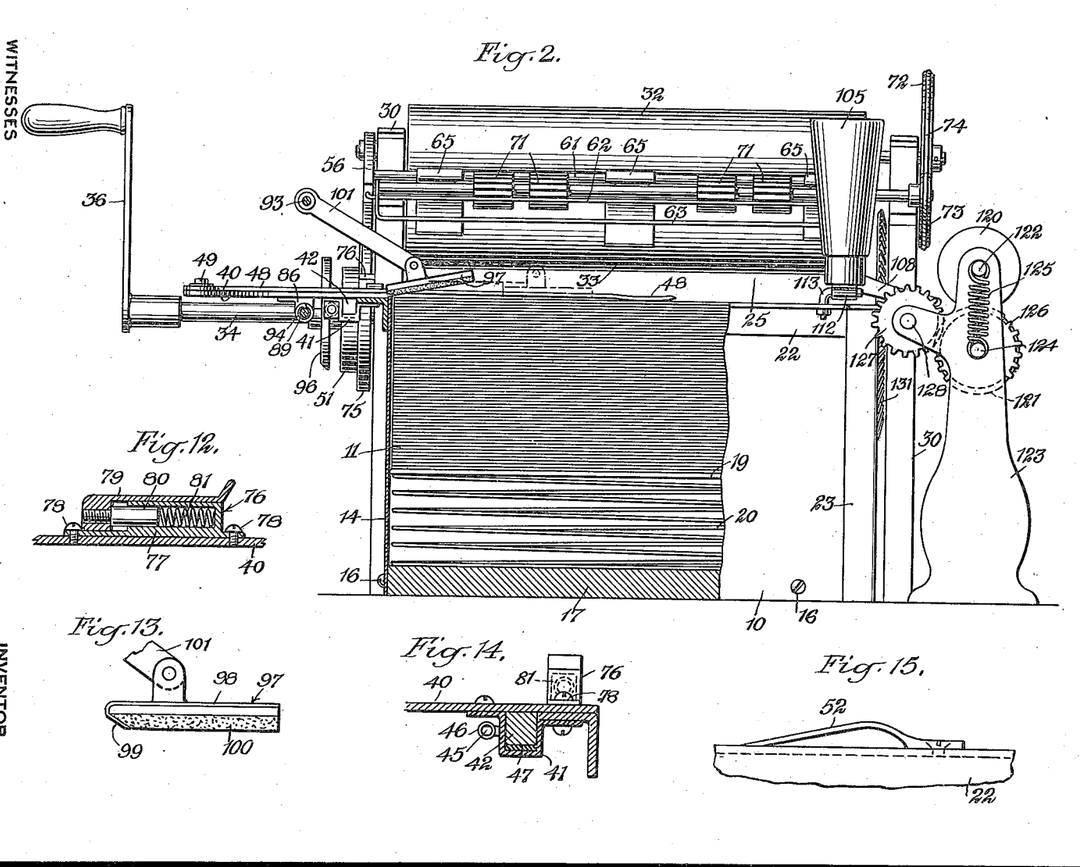
Fig. 2 is an end view of the machine, the same being shown partly in section.
Fig. 12 is a longitudinal section of the stuffing assembly latch.
Fig. 13 is an enlarged view of the feed pad.
Fig. 14 is an enlarged detail section of parts of the means for operating the flap throw member.
Fig. 15 is an enlarged side view of the raising and lowering guide which controls the movement of the flap throw member.

In order to stuff, insert or introduce the folded sheets in succession into the envelopes as they are presented in succession to the abutment means 18, use is made of an assembly 55 presently to be described. An L-shaped member 56 is mounted on the arbor 35 of the roller 32 on the crank side of the machine, and this constitutes a rock lever. A straight member 57 has one end pivotally connected with the other arbor 35 of the roller 32 and serves as an arm in spaced relation to the lever 56. The arm 57 is pivotally connected by virtue of a half-round notch 58 therein, and a clip 59 which is secured to the arm by a screw 60. The notch 58 receives the arbor 35 and the clip 59 shaped to the arbor embraces it. Lever 56 and arm 57 are connected by truss rods 61 and 62. A bracer and envelope hold down element 63 of U shape is pivotally or swingably connected with the lever 56 and arm 57, as at 64, so that it may be raised to an out-of-the-way position when filling the magazine 10 with a new supply of envelopes. Guide fingers 65 are mounted on the rod 61 for pivotal movement, said rod 61 providing a horizontal pivot for the fingers 65. These fingers are adjustable axially on the rod 61. Each of the fingers 65 is substantially of V shape to provide portions 66 and 67 respectively. The portion 66 is bowed or curved longitudinally, whereas the portion 67 is straight. There are three fingers 65. The portion 67 of each finger 65 has a plurality of holes 68 therein. Spacer rods 69 with right angle terminals connect said fingers 65 in spaced and adjusted relation. The terminals of the rods 69 are receivable in any of the holes 68. The middle finger portion 66 is longer than the other two portions 66 due to the V shape cut of the mouth edge of the back wall of the envelope. The fingers 65 are engageable with the mouth edge portion of the back wall of the body of each envelope to raise the same, and thus facilitate the insertion of the folded sheet into the envelope pocket when the flap of the envelope is thrown back. The portions 67 of the fingers engage a shaft 70 to limit the downward movement of the fingers when the assembly 55 is raised. The shaft 70 is supported by the lever 56 and arm 57 crosswise with respect thereto, near the extremities of their free ends and just inside of the rod 62 which serves as a guard beyond the peripheries of stuffing rollers 71. These rollers 71 are preferably made of rubber and are mounted on the shaft 70 to rotate therewith for the purpose of stuffing or inserting into the envelopes the folded sheets presented thereto in succession when the assembly 55 is down. A grooved pulley 72 is fast on the arbor 35 adjacent the arm 57, and a grooved pulley 73 is fast on the shaft 70, and a belt 74 encircles the pulleys 72 and 73. Therefore, it will be understood that the rollers 71 will be rotated clockwise as indicated in Fig. 6, in response to the rotation of the roller 32; and that the assembly 55 may be swung up and down on said arbors 35 while said rollers 71 are rotating. The rod 62 aids in giving rigidity to the assembly 55, and holds down the mouth of each envelope, thereby preventing the envelope from being wrapped around the rollers 71 when the assembly 55 is being raised. A cam 75 is fast on the shaft 34 and it acts on the lever 56 to raise the assembly 55 and then allow it to swing down for the stuffing operation once in each revolution of the shaft 34, in timed accord with the operation of the throw member 48. A suitable latch 76 is secured to the table frame 22 in operative position with respect to the lever 56. This latch is shown most clearly in Figs. 3, 4, and 12. The latch consists of a tubular guide 77 secured as at 78 to the bracket 40, a latch member 79 having a plunger 80 which moves in the guide 77, and a compression spring 81 arranged in the guide and having one end thereof bearing on the plunger 80, and its other end bearing on the end wall of the guide. The latch member 79 is thus mounted to slide back and forth, the forward movement being limited by one of the screws 78. The assembly 55 may be swung up to an out-of-the-way position, as indicated in dotted lines in Fig. 4, when it is necessary to replenish the magazine 10 with envelopes. The latch member 79 will move back to allow the lower end of the lever 56 to clear it whereupon the latch member 79 will return under the action of the spring 81 to a latching position, in which position it will be engaged by the lower end of the lever 56 to hold the assembly 55 up in the out-of-the-way position. The latch member 79 may be manipulated to release the assembly 55 for cooperation of its lever 56 with the cam 75.

Figure 3:
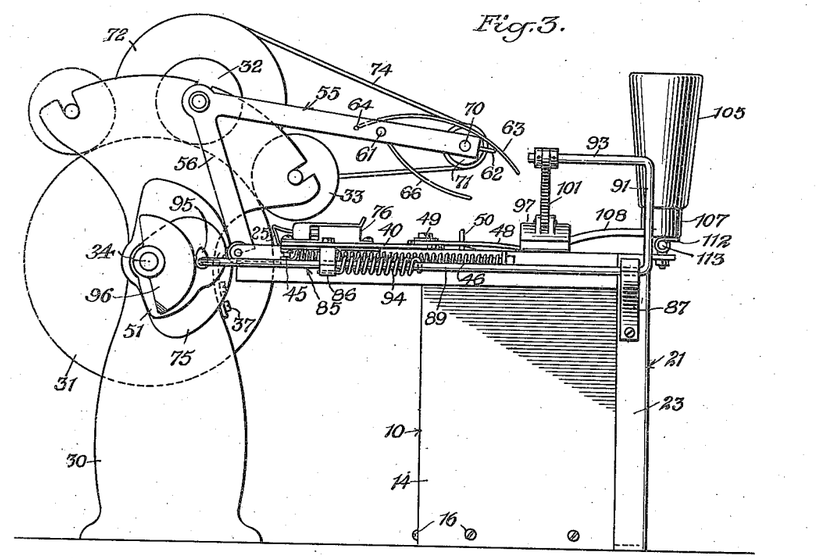
Fig. 3 is a side view of the machine.
Figure 4:
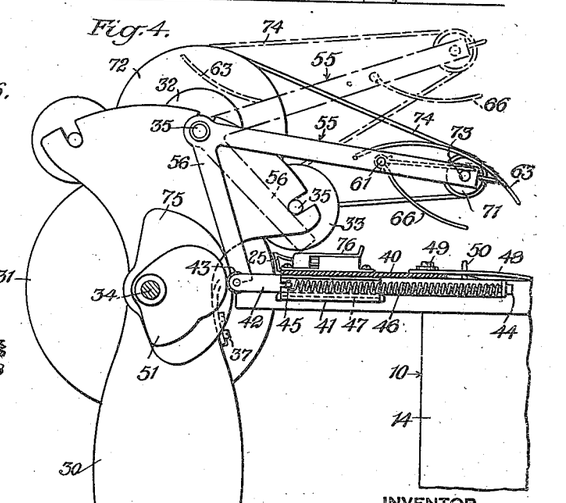
Fig. 4 is a view similar to Fig. 3, portions of the machine being broken away and other portions thereof being shown in section.
Figure 5:
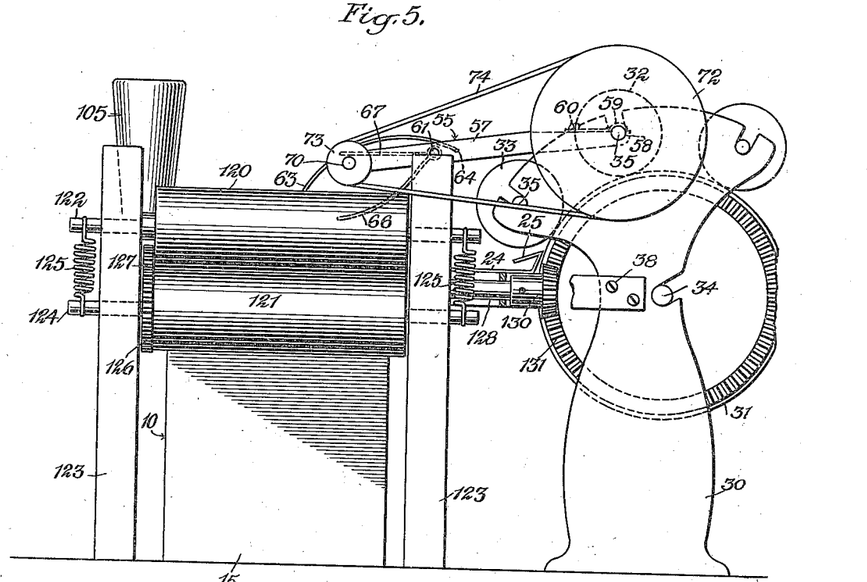
Fig. 5 is a view of the side of the machine opposite that shown in Fig. 3.

In order to advance each envelope a predetermined distance after it has received the folded sheet, for the moistening of the flap adhesive and the sealing operation, use is made of a feeder presently to be described. A rocker 85 is supported by a bearing 86 on the under side of the bracket 40 and a bearing 87 secured to one of the legs 23 of the frame 22. The rocker 85 is made of cross-sectionally round rod stock in one piece to provide an axle portion 89, radius portions 90 and 91 respectively on the opposite ends of the portion 89, stop portion 92 in continuation of the portion 90 at a right angle thereto, and a crank portion 93 in continuation of the portion 91 at a right angle thereto. The portion 89 is received by the bearings 86 and 87. A coil spring 94 surrounds the portion 89 and has one end thereof secured to the portion 89 and its opposite end is secured to the bearing 86 as shown in Fig. 3. A wear piece 95 is secured to the portion 90, said piece 95 being acted on by a cam 96 fast on the shaft 34 to rock the rocker 85 in one direction for advancing the envelope, the spring 88 serving to return the rocker 85. Use is made of a feed pad 97 consisting of a metal back 98 providing a heel 99, and a rubber friction element 100 is secured to said back 98. A link 101 has one end pivotally connected with the crank portion 93 and its other end pivotally connected with a lug 102 on the back 98 of the pad. The cam 96 acting on the wear piece 95 and through the intervention of the rocker 85 and link 101, causes the pad 97 to move forward, thereby advancing the uppermost envelope in the magazine 10. This takes place while there is a dwell in the forward movement of the flap throw member 48 in closing the flap of the uppermost envelope. The pad 97 is returned instantly by the spring 94 which acts on the axle portion 89 of the rocker. The portion 92 of the rocker engages the bracket 40 to limit the return movement of the rocker and therefore the pad 97. The pad is moved forward and backward once in each revolution of the shaft 34, and this action is in timed accord with the operation of the flap operating means and the stuffing means.

In order to condition or moisten the film of adhesive substance on the inside of the flap of each envelope as it is advanced by the pad 97, use is made of a moistener presently to be described. A water font or bottle 105 has a resilient discharge control means 106 on its lower outlet end. The lower end of the font 105 is received in a socket 107 formed on one end of a water distributing tube 108 so that said tube will be in communication with the font and project laterally with respect thereto. The tube 108 is flat and tapered, there being an air vent 109 therein, also a series of fine discharge holes 110 and a very narrow longitudinal slit 111 between the series of holes 110. When the tube 108 is filled with water the discharge means 106 will be sealed stopping the outflow of water from the font 105. When the level of the water in the tube drops air enters through the vent 109 and allows the outflow of water from the font. The tube 108 projects in the path of the flaps of the envelopes as they are successively advanced by the pad 97. The tube 108 has a spring clip 112 on the under side thereof at the socket 107, and an L-shaped support 113 on the frame 22 receives the clip 112 to detachably support the moistener in operative position. The flap of each envelope as closed by the throw member 48 is always partly raised. Hence as the envelope is advanced the flap will pass in contact with the upper surface of the tube, and the adhesive substance of the flap will take up or be smeared with water passing out of the holes 110 and slit 111. The flap may then be secured to the body of the envelope to effectually seal the latter.

In order to aid in moistening the flaps of the envelopes and also to secure the flaps to seal the envelopes as they are fed in succession by the feeder hereinbefore described, use is made of means as follows. A pair of pressure rollers 120 and 121 respectively are mounted for rotation. The roller 120 has a shaft 122 whose opposite ends extend through slots respectively formed in spaced standards 123 arranged at the discharge end of the magazine. The roller 121 has a shaft 124 whose opposite ends are received by and project beyond bearings respectively by the standards. Coiled tension springs 125 connect the adjacent ends of the shafts 122 and 124 respectively to maintain a desired amount of pressure of the rollers 120 and 121, and to yieldingly hold the roller 120 in cooperative relation to the roller 121. A gear 126 is fast on the shaft 124 between one end of the roller 121 and the adjacent standard. A gear 127 fast on a shaft 128 meshes with the gear 126. The shaft 128 is supported for rotation by bearings 129 on the standards 123 respectively. A bevel pinion gear 130 fast on the shaft 128 meshes with a bevel drive gear 131 fast on the drive shaft 34. Thus the rollers 120 and 121 are kept in motion while the shaft 34 is rotating. The feeder advances the envelopes containing enclosures successively to the pinch of the rollers 120 and 121 and they positively continue the movement of each envelope delivered thereto by the pad 97. At the same time the rollers 120 and 121 exert pressure on the opposite sides of the envelope. The flap of each envelope in passing between the rollers 120 and 121 is forced down in contact with the moistener tube 108 for thorough wetting of the adhesive on the flap. The rollers 120 and 121 finally press the flap down against the body of the envelope to secure it and so sealing the envelope.

Figure 7:
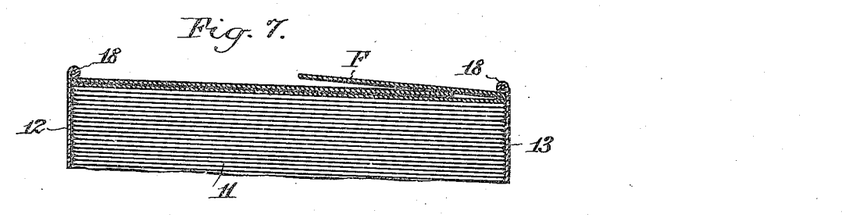
Figs. 7 to 11, inclusive, are fragmentary sections of the envelope magazine, and progressively illustrating the manner in which the flap of the uppermost envelope of the stack is thrown back; a folded sheet is introduced in said envelope; and the flap is returned to its original position after said introduction of the sheet.
Figure 8:
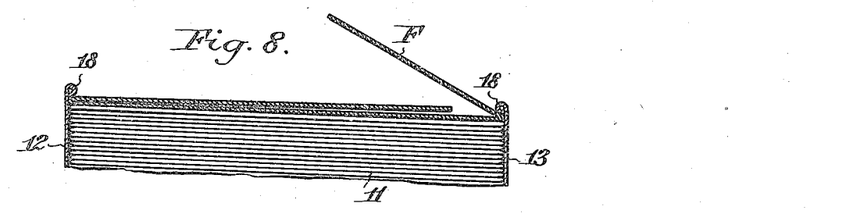
Figure 9:
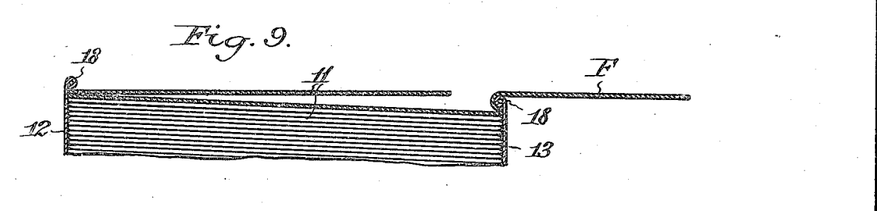
Figure 10:
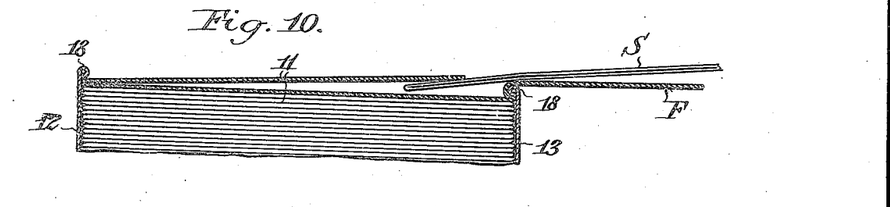
Figure 11:
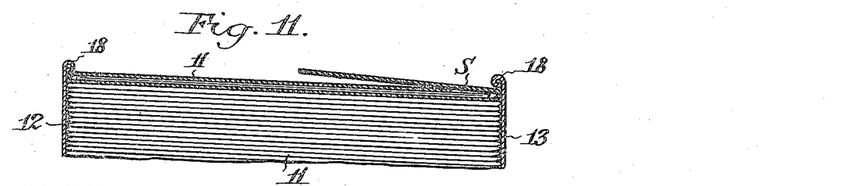
Figure 16:
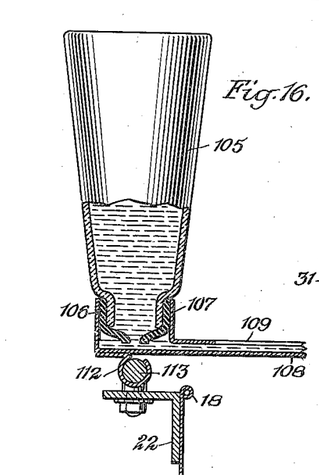
Fig. 16 is an enlarged section of the moistener font and connected parts.

Briefly the sequence of operation is as follows. By operating the crank 36, folded sheets are delivered successively by the rollers 31 and 33. In timed accord therewith the throw member 48 engages under the flap of the uppermost envelope in the magazine thereby throwing it back to open position over and in contact with the top plate 24. At the same time the folded sheet is being advanced by the rollers 31 and 33 to the deflector 25, and the assembly 55 is moving downwardly to bring the rollers 71 into cooperative relation with the plate 24. The curved portions 66 of the guide fingers ride on the thrown back flap of the envelope as the assembly 55 lowers and engage the mouth edge portion of the back wall of the envelope body raising the same as shown in Fig. 6. The element 63 restrains the raising of said back wall and keeps the envelope in engagement with the abutment means 18. As the folded sheet advances by the action of the rollers 31 and 33 guided by the deflector 25, the leading edge of the folded sheet, presented to the rollers 71 will advance the sheet between the envelope flap and the guide portions 66 into the pocket of the envelope. The assembly 55 commences to raise and at the same time the throw member 48, which has moved beyond the flap, starts returning under the flap, which raises itself slightly, the flap being returned by the member 48 to its closed position in which it remains raised somewhat as shown in Fig. 11. The feed pad 97 advances the envelope with its contents to a point to be gripped by the rollers 120 and 121, whereupon the pad 97 instantly returns to its retracted position. At this time the throw member 48 dwells momentarily and then comes on to engage the flap of the succeeding envelope. The adhesive on the flap of the advance envelope will be moistened by the tube 108 and the flap will then be secured to seal the envelope by the rollers 120 and 121 which discharge it into any suitable receptacle. In Fig. 7 the flap of the uppermost envelope is about to be thrown back to open position. In Fig. 8 the flap is shown partly thrown back. In Fig. 9 the flap is thrown fully back. In Fig. 10 the folded sheet is being stuffed or inserted into the pocket of the envelope while the flap is held down. In Fig. 11 the flap is shown in closed position with the folded sheet inside the envelope.

The assembly 55 may be swung up into an out-of-the-way position and then be retained therein by the latch 76 until released. The element 63 may be swung back when the assembly is latched up, thereby making it an easy matter to put an additional supply of empty and unsealed envelopes in the magazine 10. The moistener may be readily detached and the font 105 separated from the socket 107 to replenish the font with water or other suitable liquid whenever necessary.

Figures 17, 19:
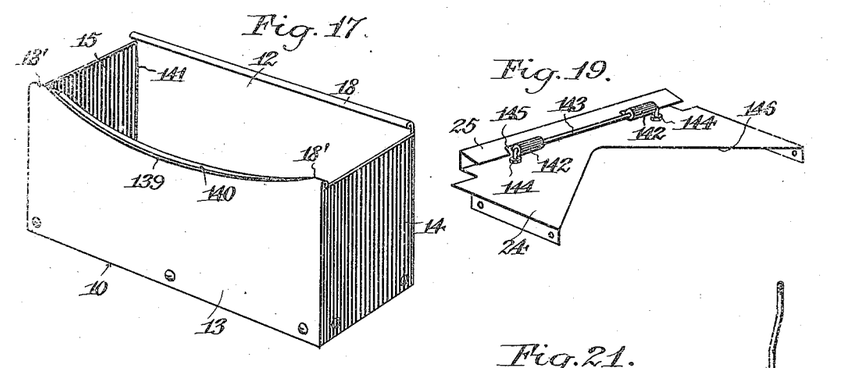
Fig. 17 is a perspective view of a modified form of envelope magazine.
Fig. 19 is a perspective view of a modified form of table top plate and deflector.

In Figs. 17 to 21 inclusive, there are shown certain modifications of the invention suitable for handling envelopes of relatively stiff paper which give considerable resiliency to the flaps. Accordingly the wall 13 of the magazine 10 is cut out as at 139 at the top on a curved line, and the curved edge is bounded by a wire 140 on the inside of the wall 13, thus constituting abutment means 18'. The separation of the side wall 12 from the adjacent end wall 15 at one corner of the magazine is indicated at 141. In this manner the side wall 12 is sprung inwardly so as to offer resistance to the envelopes and thus prevent endwise movement thereof except the top or uppermost one of the stack as explained hereinbefore. By cutting away a portion of the wall 13 of the magazine as shown in Fig. 17 the flap of each envelope presented to the abutment means will be effectually sprung upwardly so as to be engaged by the throw member 48, and, at the same time, the mouth of the envelope will be opened to readily receive the folded sheet. In order to extend the movement of the folded sheets as they pass from the rollers 31 and 33, the deflector 25 carried by the top plate 24 of the table has arranged with relation thereto rubber rollers 142 mounted on a rod 143 whose downturned ends are secured as at 144 to the plate 24. The deflector 25 is cut away as at 145 to accommodate the rollers 142. The rollers 142 cooperate with the auxiliary roller 33. The top plate 24 is cut away as at 146 in order to provide clearance for the flap of each envelope.

Figures 18, 21:
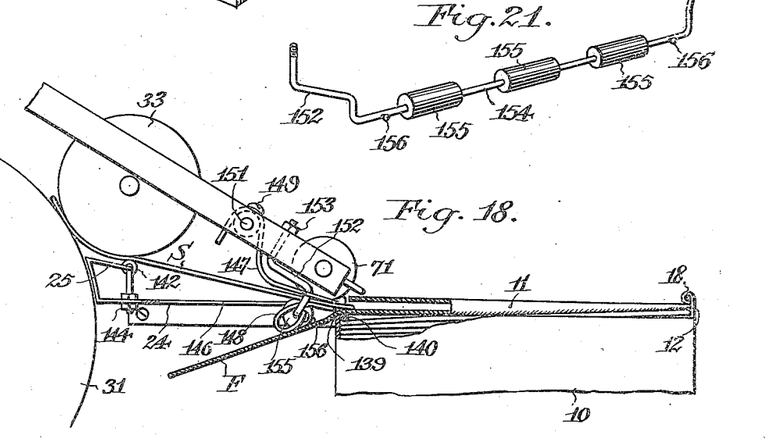
Fig. 18 is a fragmentary side view and part section showing a modified form of sheet stuffing assembly.
Fig. 21 is a perspective view of a hanger with friction rollers.
Figure 20:
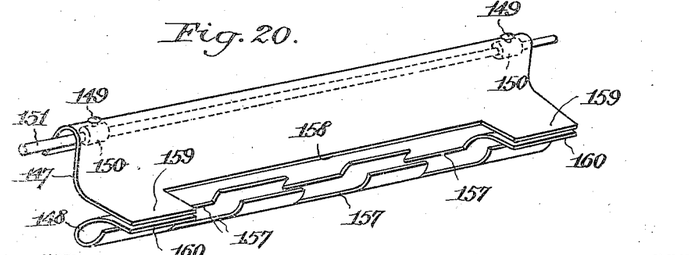
Fig. 20 is a perspective view of upper and lower guides for opening the mouth of each envelope and for guiding each folded sheet fed thereto into the envelope.

In lieu of the guide fingers 65 use may be made of an upper guide 147 and a lower guide 148 which cooperates with the guide 147 for the purpose of opening the mouth of the envelope pocket and for guiding a folded sheet into said pocket. The guide 147 is secured by screws 149 to collars 150 carried by a rod 151. The rod 151 is supported by the members 56 and 57 of the assembly 55. The screws 149 bind on the rod 151 leaving but little play for the guide 147. A hanger 152 is supported by the members 56 and 57, the hanger being secured by nuts 153 applied to threaded portions extending through the members 56 and 57, respectively. The hanger provides a shaft 154 for rubber rollers 155 mounted on said shaft in spaced relation. The lower guide 148 is secured to the hanger 152 by screws 156 carried by the shaft 154. The guide 148 is cut away as at 157 to accommodate the rollers 155 and the guide 147 is also cut away as at 158 for this purpose. The guides 147 and 148 have portions 159 and 160 respectively which engage the entrance edge portion of the back wall of each envelope to flex said wall upwardly upon the downward movement of the assembly 55, and said portions 159 and 160 also serve to guide each folded sheet into the envelope pocket assisted by the stuffing rollers 71 and the rollers 155 which cooperate with the rollers 71. The cutaway 146 provides clearance for the guides 147 and 148, and the hanger 152 and the rollers 155 carried thereby.

Referring to Fig. 18 it will be apparent that the folded sheet S as it enters the envelope 11 is being gripped and driven at three points and therefore controls the movement of the sheet in such manner as to insure its introduction into the pocket of the envelope.

It is to be understood that the machine of the present invention may be fed by means other than a folding machine and that cards and closely analogous matter may be stuffed or inserted into suitable containers.

It is further to be understood that details of construction may be modified and the parts rearranged without departing from the invention as expressed in the appended claims.

I claim:

1. In a machine of the character described, the combination of means to feed empty unsealed envelopes one at a time to a predetermined position, a movable flap throw member, means to operate said member to throw back the flap of each envelope so that desired matter may be inserted thereinto while in said position and then return said flap, means operable to insert said matter into the envelope, means to condition the flap so that it may be secured to the body of the envelope to seal the latter, and means to secure said flap for the aforesaid purpose.

2. In a machine of the character described, the combination of means to feed empty unsealed envelopes one at a time to a predetermined position, a movable flap throw member, means to operate said member to throw back the flap of each envelope so that desired matter may be inserted thereinto while in said position and then return said flap, means operable to insert said matter into the envelope, means to moisten the usual adhesive on the flap so that it may be secured to the body of the envelope to seal the latter, and means to secure said flap for the aforesaid purpose.

3. In a machine of the character described, the combination of means to feed empty unsealed envelopes one at a time to a predetermined position, a movable flap throw member, means to operate said member to throw back the flap of each envelope so that desired matter may be inserted thereinto while in said position and then return said flap, means operable to insert said matter into the envelope, means to move each envelope after the insertion of said matter, means to moisten the adhesive on each envelope flap after the insertion of said matter and upon the movement of the envelope by said fourth means, so that the flap may be secured to the body of the envelope to seal the latter, and means to secure said flap, for the aforesaid purpose, upon the continued movement of the envelope by said fourth means.

4. In a machine of the character described, the combination with a sheet folding device, of a movable flap throw member, means to operate said member to throw back the flaps respectively of envelopes fed successively thereto and to return said flaps, and a stuffer operable to severally stuff sheets folded by said device into said envelopes while their flaps are thrown back, said folding device, flap throw member operating means and the stuffer operating in timed accord.

5. In a machine of the character described, the combination with a sheet folding device, of means operable to throw back the flaps respectively of envelopes fed successively thereto and to return said flaps, and a stuffer operable to severally stuff sheets folded by said device into said envelopes while their flaps are thrown back, said stuffer comprising a frame movable into and out of a feeding position, feed rollers mounted in said frame, and driving means to rotate said rollers.

6. In a machine of the character described, the combination with a sheet folding device, of means operable to throw back the flaps respectively of envelopes fed successively thereto and to return said flaps, and a stuffer operable to severally stuff sheets folded by said device into said envelopes while their flaps are thrown back, said stuffer comprising a frame movable into and out of a feeding position, feed rollers mounted in said frame, means to move the frame as aforesaid, and driving means to rotate said rollers, said frame moving means being operated by a movable part of said folding device, and said driving means being operated by another movable part of said folding device.

7. In a machine of the character described, a device for throwing back and returning the flaps of envelopes respectively fed successively thereto, said device comprising a movable flap throw member, and means to cause the movement of said member to throw back the flap of each envelope from a normally closed position to an open position and to return the flap to the closed position.

8. In a machine of the character described, a device for throwing back and returning the flaps of envelopes respectively fed successively thereto, said device comprising a movable flap throw member, and means to cause the movement of said member to throw back the flap of each envelope from a normally closed position to an open position and to return the flap to the closed position, said means including a reciprocable rod connected with said member, and a resilient element to cause the return movement of said rod.

9. In a machine of the character described, a device for throwing back and returning the flaps of envelopes respectively fed successively thereto, said device comprising a pivotally mounted flap throw member, and means to cause the movement of said member to throw back the flap of each envelope from a normally closed position to an open position and to return the flap to the closed position.

10. In a machine of the character described, a device for throwing back and returning the flaps of envelopes respectively fed successively thereto, said device comprising a pivotally mounted flap throw member, and means to cause the movement of said member, said means including a reciprocable rod pivotally connected with said member, and a resilient element to cause the return movement of said rod.

11. The combination with a sheet folding machine including a rotatable element; of a stuffer which stuffs the folded sheets issuing from the machine, severally into suitable envelopes, a plate on which the folded sheets may slide, said stuffer comprising a frame, feed rollers mounted on said frame, and driving means between the rollers and said rotatable element to rotate said rollers, said frame being mounted for movement with respect to said plate to put the rollers into and out of cooperative relation thereto, the rollers in the cooperative relation to the plate causing the stuffing of the folded sheets into said envelopes.

12. In a machine of the character described, the combination of a device for throwing back the flaps of envelopes from their normally closed position to open position and then returning the flaps of envelopes respectively fed successively thereto, and means for successively feeding envelopes so that their flaps may be acted on by said device for the purpose mentioned.

13. In a machine of the character described, the combination of a magazine to contain in stack formation a multiplicity of unsealed empty envelopes, said magazine having an abutment engageable by each of the envelopes presented thereto so as to partly raise its flap, means in the magazine to exert upward force on said stack to feed one envelope at a time into engagement with said abutment, and a device operable to throw back the partly raised flap of each envelope, so that matter may be inserted therein, and then return said flap.

14. In a machine of the character described, the combination of a magazine to contain in stack formation a multiplicity of unsealed empty envelopes, said magazine having an abutment engageable by each of the envelopes presented thereto so as to partly raise its flap, means in the magazine to exert upward force on said stack to feed one envelope at a time into engagement with said abutment, and a rigid member mounted for pivotal movement in a plane above said abutment to throw back the partly raised flap of each envelope, so that matter may be inserted thereinto, and then return said flap.

15. In a machine for stuffing suitable matter in envelopes successively retained in a substantially horizontal position with the flap of each envelope thrown back in the plane of the body thereof, a horizontal plate on which said flap may rest, a frame above said plate movable with respect to the plate, fingers carried by said frame to engage the mouth portion of the back wall of the envelope body to raise the same, as the frame is brought down bringing said fingers in contact with said plate, and means carried by said frame operable to feed said matter, while resting on the plate, between the latter and the fingers into the envelope.

16. In a machine for stuffing suitable matter in envelopes successively retained in a substantially horizontal position with the flap of each envelope thrown back in the plane of the body thereof, a horizontal plate on which said flap may rest, a frame above said plate swingable on a horizontal axis with respect to the plate, fingers carried by said frame to engage the mouth portion of the back wall of the envelope body to raise the same, as the frame is brought down bringing said fingers in contact with said plate, and means carried by said frame operable to feed said matter, while resting on the plate, between the latter and the fingers into the envelope.

17. In a machine for stuffing suitable matter in envelopes successively retained in a substantially horizontal position with the flap of each envelope thrown back in the plane of the body thereof, a horizontal plate on which said flap may rest, a frame above said plate movable with respect to the plate, fingers swingable on a horizontal shaft carried by said frame to engage the mouth portion of the back wall of the envelope body to raise the same, as the frame is brought down bringing said fingers in contact with said plate, and means carried by said frame operable to feed said matter, while resting on the plate, between the latter and the fingers into the envelope.

18. In a machine for stuffing suitable matter in envelopes successively retained in a substantially horizontal position with the flap of each envelope thrown back in the plane of the body thereof, a horizontal plate on which said flap may rest, a frame above said plate movable with respect to the plate, fingers carried by said frame to engage the mouth portion of the back wall of the envelope body to raise the same, as the frame is brought down bringing said fingers in contact with said plate, and driven rollers carried by said frame operable to feed said matter, while resting on the plate, between the latter and the fingers into the envelope.

19. In a machine for stuffing suitable matter into envelopes successively retained in a substantially horizontal position with the flap of each envelope thrown back in the plane of the body thereof, a horizontal plate on which said flap may rest, a frame above said plate swingable on a horizontal axis with respect to said plate, fingers pivotally mounted on said frame to engage the mouth portion of the back wall of the envelope body to raise the wall, as the frame is brought down bringing the said fingers in contact with said plate, and feed rollers mounted on said frame to rotate on a horizontal axis to feed said matter, while resting on said plate, between the latter and the fingers into said envelope.

20. In a machine for stuffing suitable matter into envelopes successively retained in a substantially horizontal position with the flap of each envelope in open position, a stuffing assembly mounted to swing up and down on a horizontal axis, said assembly including upper and lower guides for directing said matter into each envelope.

21. In a machine for stuffing suitable matter into envelopes successively retained in a substantially horizontal position with the flap of each envelope in open position, a stuffing assembly mounted to swing up and down on a horizontal axis, said assembly including upper and lower guides and cooperative rollers for directing said matter into each envelope.

22. In a machine of the character described, a device to feed empty and unsealed envelopes one at a time to a predetermined position with its flap partly raised from the back wall, said device including a magazine which holds the envelopes in stack formation, one side wall of the magazine being higher than the other side wall and the latter being adjacent the flap side of the envelopes, and each of said walls having abutment means extending longitudinally on the inside thereof encountered by the envelopes in turn.

23. In a machine of the character described, a device to feed empty and unsealed envelopes one at a time to a predetermined position with its flap partly raised from the back wall, said device including a magazine which holds the envelopes in stack formation, one side wall of the magazine being cut away at its upper edge, and both side walls of the magazine having abutment means encountered by the envelopes in turn.

24. In a machine of the character described, a device to feed empty and unsealed envelopes one at a time to a predetermined position with its flap partly raised from the back wall, said device including a magazine which holds the envelopes in stack formation, one side wall of the magazine being higher than the other side wall and the latter wall being adjacent the flap side of the envelopes and being cut away at the center and upper edge thereof, and both of said side walls having abutment means extending longitudinally of the upper marginal portions thereof encountered by the envelopes in turn.

25. In a machine of the character described, the combination of a device for throwing back and returning the flaps of envelopes respectively fed successively thereto, said device comprising a movable flap throw member, and means to cause movement of said member to throw back the flap of each envelope from its normally closed position to an open position and to return the flap to the closed position; and a stuffer to stuff material into each envelope after its flap has been thrown back.

26. In a machine of the class described, a device for throwing back and returning the flaps of envelopes respectively fed successively thereto, said device including a flap throw member, a pivot with which said member is connected so that said member may swing laterally while it pivots up and down with respect to said pivot, means operable to swing said member, and means to cause said member to pivot up and down in response to the operation of said first means.

27. In a machine of the class described, a device for throwing back and returning the flaps of envelopes respectively fed successively thereto, said device including a flap throw member, a pivot with which said member is connected so that said member may swing laterally while it pivots up and down with respect to said pivot, a reciprocating rod having a pin and slot connection with said member, a retractile spring which acts on said rod, and means to cause said member to pivot up and down in response to the operation of said rod.

28. In a machine of the class described, a device for throwing back and returning the flaps of envelopes respectively fed successively thereto, said device including a flap throw member, a pivot with which said member is connected so that said member may swing laterally while it pivots up and down with respect to said pivot, means operable to swing said member, and a cam on which said member rides to cause said member to pivot up and down in response to the operation of said means.

29. In a machine of the class described, a device for throwing back and returning the flaps of envelopes respectively fed successively thereto, said device including a flap actuating member consisting of a tapered blade, a vertical pivot with which said member is connected so that said member may swing laterally while it pivots up and down on said pivot, means operable to swing said member, and means to cause said member to move up and down in response to the operation of said first means.

WALDO E. ROSEBUSH.